US009653092B2

(12) United States Patent
Sun et al.

(10) Patent No.: US 9,653,092 B2
(45) Date of Patent: May 16, 2017

(54) METHOD FOR CONTROLLING ACOUSTIC ECHO CANCELLATION AND AUDIO PROCESSING APPARATUS

(71) Applicant: Dolby Laboratories Licensing Corporation, San Francisco, CA (US)

(72) Inventors: Xuejing Sun, Beijing (CN); Dong Shi, Shanghai (CN); Kai Li, Beijing (CN)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 14/651,564

(22) PCT Filed: Nov. 25, 2013

(86) PCT No.: PCT/US2013/071625
§ 371 (c)(1),
(2) Date: Jun. 11, 2015

(87) PCT Pub. No.: WO2014/099281
PCT Pub. Date: Jun. 26, 2014

(65) Prior Publication Data
US 2015/0332704 A1 Nov. 19, 2015

Related U.S. Application Data

(60) Provisional application No. 61/753,594, filed on Jan. 17, 2013.

(30) Foreign Application Priority Data

Dec. 20, 2012 (CN) .......................... 2012 1 0560728

(51) Int. Cl.
*G10L 21/00* (2013.01)
*H04M 9/08* (2006.01)
(Continued)

(52) U.S. Cl.
CPC ...... *G10L 21/0208* (2013.01); *G10L 21/0264* (2013.01); *H04B 3/23* (2013.01);
(Continued)

(58) Field of Classification Search
USPC ....... 704/228, 227, 207, 206, 500, 214, 211, 704/503, 205; 370/493, 352, 286, 201,
(Continued)

(56) References Cited

U.S. PATENT DOCUMENTS 5,761,318 A    6/1998  Shimauchi
6,246,760 B1   6/2001  Makino
(Continued)

FOREIGN PATENT DOCUMENTS

WO    2012/046256    4/2012

OTHER PUBLICATIONS

Sun, X. et al "Robust Noise Estimation Using Minimum Correction with Harmonicity Control" Interspeech 2010, 11th Annual Conference of the International Speech Communication Association, Sep. 26-30, 2010.
(Continued)

*Primary Examiner* — Pierre-Louis Desir
*Assistant Examiner* — Neeraj Sharma

(57) ABSTRACT

A method for controlling acoustic echo cancellation and an audio processing apparatus are described. In one embodiment, the audio processing apparatus includes an acoustic echo canceller for suppressing acoustic echo in a microphone signal, a jitter buffer for reducing delay jitter of a received signal, and a joint controller for controlling the acoustic echo canceller by referring to at least one future frame in the jitter buffer.

19 Claims, 11 Drawing Sheets

(51) Int. Cl.
*G10L 21/0208* (2013.01)
*G10L 21/0264* (2013.01)
*H04B 3/23* (2006.01)
*H04L 12/66* (2006.01)
*H04J 3/10* (2006.01)
*H04L 12/16* (2006.01)
*H04B 3/20* (2006.01)
*H04B 1/38* (2015.01)
*H04L 27/00* (2006.01)
*G06F 17/00* (2006.01)
*H04L 12/861* (2013.01)

(52) U.S. Cl.
CPC ... *H04M 9/082* (2013.01); *G10L 2021/02082* (2013.01); *H04L 49/90* (2013.01)

(58) Field of Classification Search
USPC ............... 370/389, 260; 379/406.08, 406.03, 379/406.01; 375/222, 326, 219; 381/66; 700/94
See application file for complete search history.

(56) References Cited

U.S. PATENT DOCUMENTS

| | | | |
|---|---|---|---|
| 6,324,170 B1 | 11/2001 | McLennon | |
| 6,765,931 B1* | 7/2004 | Rabenko | H04B 3/23 348/E7.049 |
| 6,912,209 B1 | 6/2005 | Thi | |
| 7,039,181 B2 | 5/2006 | Marchok | |
| 7,089,390 B2 | 8/2006 | Hemsing | |
| 7,333,447 B2 | 2/2008 | LeBlanc | |
| 7,420,937 B2 | 9/2008 | LeBlanc | |
| 7,546,125 B2 | 6/2009 | Sharma | |
| 7,760,673 B2 | 7/2010 | LeBlanc | |
| 7,773,581 B2 | 8/2010 | Punj | |
| 7,773,741 B1 | 8/2010 | LeBlanc | |
| 7,831,421 B2* | 11/2010 | Khalil | G10L 21/045 704/206 |
| 7,869,587 B2 | 1/2011 | Kim | |
| 8,185,384 B2* | 5/2012 | Sun | G10L 25/90 704/207 |
| 8,185,388 B2* | 5/2012 | Gao | G10L 19/005 704/228 |
| 2004/0120308 A1 | 6/2004 | LeBlanc | |
| 2008/0080702 A1 | 4/2008 | Zhang | |
| 2008/0240004 A1 | 10/2008 | Shaffer | |
| 2009/0009818 A1 | 1/2009 | Mita | |
| 2009/0030654 A1* | 1/2009 | Koike | H04M 9/082 702/191 |
| 2009/0190614 A1 | 7/2009 | Jougit | |
| 2009/0238085 A1 | 9/2009 | Khanduri | |
| 2010/0161086 A1* | 6/2010 | Andersen | G10L 19/005 700/94 |
| 2010/0191525 A1* | 7/2010 | Rabenko | H04B 3/23 704/211 |
| 2010/0198590 A1* | 8/2010 | Tackin | G10L 25/90 704/214 |
| 2010/0223311 A1 | 9/2010 | Sugiyama | |
| 2010/0278159 A1 | 11/2010 | Khanduri | |
| 2011/0125505 A1* | 5/2011 | Vaillancourt | G10L 19/005 704/500 |
| 2011/0205915 A1 | 8/2011 | Skrabutenas | |
| 2011/0235500 A1* | 9/2011 | Shenoi | H04J 3/0632 370/201 |
| 2012/0136654 A1* | 5/2012 | Lou | H04M 9/082 704/205 |

OTHER PUBLICATIONS

Li, Y. et al "Joint Power/Playout Control Schemes for Media Streaming over Wireless Links" IEEE Packet Dec. 2004, Irvine CA, pp. 1-10.

Rassameeroj, I. et al "Echo Cancellation in Voice over IP" 5th International Conference on Information Technology and Applications (ICITA 2008), p. 570-575.

Dyba, R. et al "Network Echo Cancellers and Freescale Solutions Using the StarCore SC140 Core" FreeScale Semiconductor, Nov. 2004.

Chang, Zhijiang "VoIP Jitter Buffer Algorithm Improvement for Wireless Environment" Faculty of Electrical Engineering, Mathematics and Computer Science, Master Thesis Project, Aug. 2004.

Mader, A. et al "Step-Size Control for Acoustic Echo Cancellation Filters—an Overview" Signal Processing, vol. 80, No. 9, pp. 1697-1719, Sep. 2000, Elservier Science Publishers B.V.

* cited by examiner

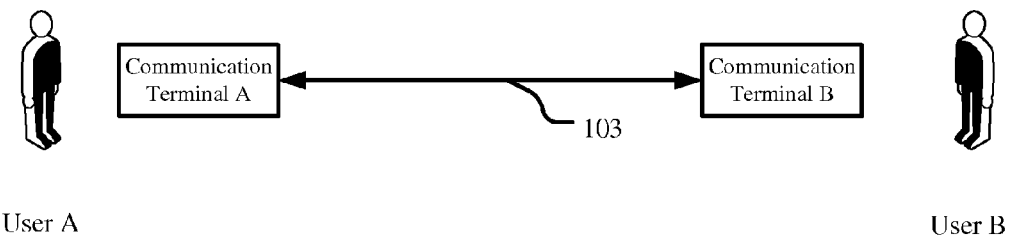
Fig. 1A
Fig. 1B
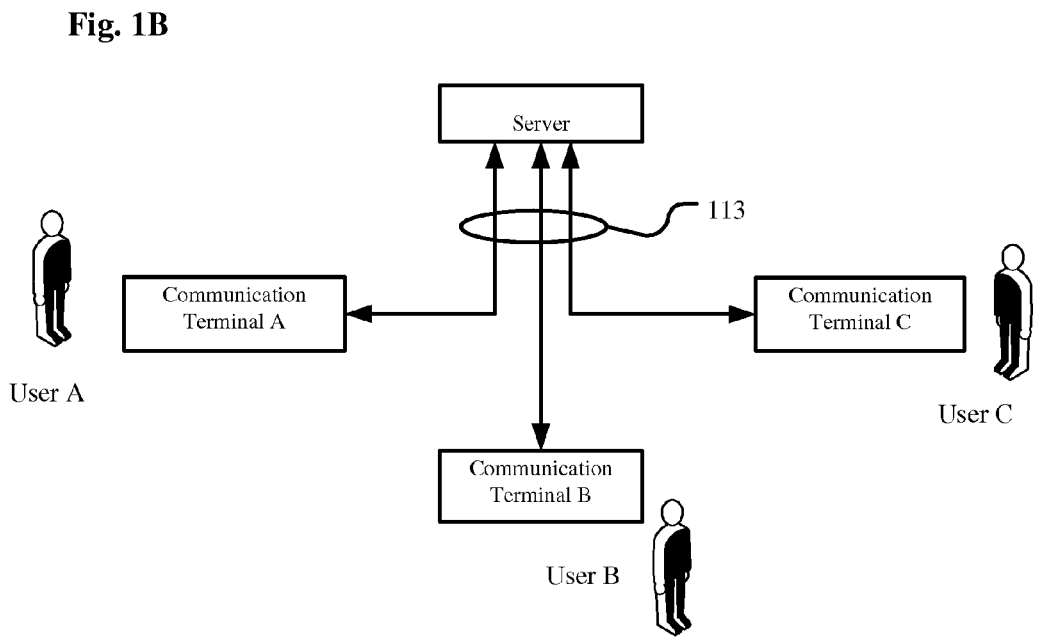

METHOD FOR CONTROLLING ACOUSTIC ECHO CANCELLATION AND AUDIO PROCESSING APPARATUS

TECHNICAL FIELD OF THE INVENTION

The present application relates generally to audio signal processing. More specifically, embodiments of the present application relate to a method for controlling acoustic echo cancellation and an audio processing apparatus for improving voice communication experience in connection with acoustic echo cancellation.

BACKGROUND OF THE INVENTION

In voice communication, acoustic echo cancellation is a great challenge. Acoustic echo is caused by the fact that the microphone may re-capture the audio signal played out by the loudspeaker (loudspeaker signal or reference signal), and thus the talker on the other side (far-end) will hear his own voice together with the input of the near end.

Delay jitter is a another problem especially when the voice communication is conducted on a packet-switch network, and generally a jitter buffer would be provided for smoothing the delay jitter so as to improve the voice communication experience.

SUMMARY OF THE INVENTION

According to an embodiment of the application, an audio processing apparatus is provided, including an acoustic echo canceller for suppressing acoustic echo in a microphone signal, a jitter buffer for reducing delay jitter of a received signal, and a joint controller for controlling the acoustic echo canceller by referring to at least one future frame in the jitter buffer.

According to another embodiment, a method for controlling acoustic echo cancellation is provided in an audio processing apparatus comprising an acoustic echo canceller for suppressing acoustic echo in a microphone signal and a jitter buffer for reducing delay jitter of a received signal. The method includes controlling the acoustic echo canceller by referring to at least one future frame in the jitter buffer.

BRIEF DESCRIPTION OF DRAWINGS

The present application is illustrated by way of example, and not by way of limitation, in the figures of the accompanying drawings and in which like reference numerals refer to similar elements and in which:

FIG. 1A is a diagram schematically illustrating an exemplary voice communication system where embodiments of the application can be applied;

FIG. 1B is a diagram schematically illustrating another exemplary voice communication system where embodiments of the application can be applied;

DETAILED DESCRIPTION OF THE INVENTION

Figure 2:
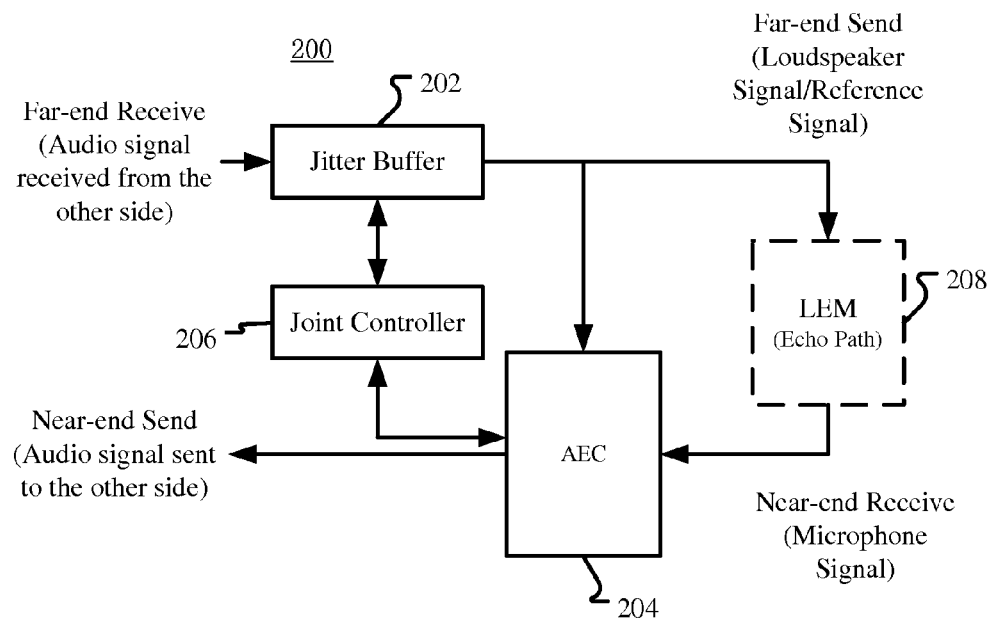
FIG. 2 is a diagram illustrating an audio processing apparatus according to an embodiment of the application.

The embodiments of the present application are below described by referring to the drawings. It is to be noted that, for purpose of clarity, representations and descriptions about those components and processes known by those skilled in the art but not necessary to understand the present application are omitted in the drawings and the description.

As will be appreciated by one skilled in the art, aspects of the present application may be embodied as a system, a device (e.g., a cellular telephone, a portable media player, a personal computer, a server, a television set-top box, or a digital video recorder, or any other media player), a method or a computer program product. Accordingly, aspects of the present application may take the form of an hardware embodiment, an software embodiment (including firmware, resident software, microcodes, etc.) or an embodiment combining both software and hardware aspects that may all generally be referred to herein as a "circuit," "module" or "system." Furthermore, aspects of the present application may take the form of a computer program product embodied in one or more computer readable mediums having computer readable program code embodied thereon.

Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic or optical signal, or any suitable combination thereof.

A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wired line, optical fiber cable, RF, etc., or any suitable combination of the foregoing.

Computer program code for carrying out operations for aspects of the present application may be written in any combination of one or more programming languages, including an object oriented programming language such as Java, Smalltalk, C++ or the like and conventional procedural programming languages, such as the "C" programming language or similar programming languages. The program code may execute entirely on the user's computer as a stand-alone software package, or partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present application are described below with reference to flowchart illustrations and/or block diagrams of methods, apparatus (systems) and computer program products according to embodiments of the application. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

System Overview

FIG. 1A is a diagram schematically illustrating an example voice communication system where embodiments of the application can be applied.

As illustrated in FIG. 1A, user A operates a communication terminal A, and user B operates a communication terminal B. In a voice communication session, user A and user B talk to each other through their communication terminals A and B. The communication terminals A and B are coupled through a data link 103. The data link 103 may be implemented as a point-to-point connection or a communication network. At either side of user A and user B, VAD (Voice Activity Detection) is performed on audio blocks of the audio signal captured by the user's communication terminal. If voice presence is decided in an audio block, corresponding processing (e.g., applying a gain suitable for voice) is performed on the audio block and the audio block is transmitted to another user's communication terminal A through the data link 103. If no voice presence is decided in an audio block, corresponding processing (e.g., applying a gain suitable for non-voice) is performed on the audio block and the audio block is transmitted to another user's communication terminal A through the data link 103. In this case, it is also possible to transmit simple information indicating a silence period to the other user's communication terminal, or to indicate that the time period corresponding to this audio block is silent by transmitting nothing. The other user's communication terminal receives the transmitted audio blocks and stores them to entries corresponding to the same time as the audio blocks in its jitter buffer, to eliminate transmission jitters. Audio blocks in the jitter buffer are fed through decoding and processing to reproduce them at the output transducer or transducers of the communication terminal. Reception of the simple information or nothing may cause corresponding empty entries in the jitter buffer.

FIG. 1B is a diagram schematically illustrating another example voice communication system where embodiments of the application can be applied. In this example, a voice conference may be conducted among users.

As illustrated in FIG. 1B, user A operates a communication terminal A, user B operates a communication terminal B, and user C operates a communication terminal C. In a voice conference session, user A, user B, and user C talk to each other through their communication terminals A, B, and C, respectively. The communication terminals illustrated in FIG. 1B have the same function as those illustrated in FIG. 1A. However, the communication terminals A, B, and C are coupled to a server through a common data link 113 or separate data links 113. The data link 113 may be implemented as a point-to-point connection or a communication network. At either side of user A, user B, and user C, VAD is performed on audio blocks of the audio signal captured by the user's communication terminal. If voice presence is decided in an audio block, corresponding processing (e.g., applying a gain suitable for voice) is performed on the audio block and the audio block is transmitted to the server through the data link 113. If no voice presence is decided in an audio block, corresponding processing (e.g., applying a gain suitable for non-voice) is performed on the audio block and the audio block is transmitted to the server through the data link 113. In this case, it is also possible to transmit simple information indicating a silence period to the server 115, or to indicate that the time period corresponding to this audio block is silent by transmitting nothing. The server receives the transmitted audio blocks and stores them to entries corresponding to the same time as the audio blocks in its jitter buffers associated with the users respectively, to eliminate transmission jitters. Audio blocks corresponding to the same time in the jitter buffers are mixed into one audio block and the mixed audio block is transmitted to all users A, B, and C. Reception of the simple information or nothing may cause corresponding empty entries in the jitter buffers. The users' communication terminals receive the audio blocks from the server and store them to entries corresponding to the same time as the audio blocks in their jitter buffers, to eliminate transmission jitters. In each communication terminal, audio blocks in the jitter buffer are fed to a voice processor to reproduce them through the speaker system of the communication terminal. Although three communication terminals are illustrated in FIG. 1B, there can reasonably be two or more communication terminals coupled in the system.

Overall Solutions

In conventional voice communication systems, acoustic echo cancellation (AEC) is conducted based on a loudspeaker signal (also referred to as a reference signal). Specifically, the AEC unit performs cancellation of a particular echo only based on those audio frames producing the particular echo in the reference signal, or earlier frames.

In the present invention, it is proposed to make use of the frames already received in the jitter buffer (JB) but not yet played out to enhance the acoustic echo cancellation. In this way, the acoustic echo cancellation takes into account not only the present and past frames, but also the future frames, and thus has better effect and is more robust.

As shown in FIG. 2, according to a first embodiment, an audio processing apparatus 200 comprises an acoustic echo canceller (AEC) 204 for suppressing acoustic echo in a microphone signal; a jitter buffer (JB) 202 for reducing delay jitter of a received signal; and a joint controller 206 for controlling the acoustic echo canceller by referring to at least one future frame in the jitter buffer.

In this embodiment, as in conventional solutions, AEC separates and filters out from the microphone signal the loudspeaker signal transmitted by LEM (Loudspeaker-Enclosure-Microphone, that is, the echo path) 208 and distorted by a transfer function of the LEM 208. However, according to the embodiment of the present application, a joint controller 206 is provided for controlling the AEC based on at least one future frame already received in the JB 202. Such control may include adjusting convergence rate and/or step size of the adaptive filter in the AEC, adjusting the threshold in a center clipper in the AEC, and/or adjusting the filter taps of the adaptive filter in the AEC. Thus, AEC can be pre-adjusted according to up-coming reference signal and thus more adapted to the properties of the same reference signal.

Please note that here the term "frame" is used. In the context of the present application, we assume "jitter buffer" is a "logical" jitter buffer storing audio frames. While depending on specific implementations, the physical jitter buffer may store any forms of packets or audio frames. Therefore, throughout the specification, the term "jitter buffer" shall be construed as including both jitter buffer actually storing audio frames and jitter buffer actually storing any forms of packets (blocks) which will be decoded into audio frames before being played out or being fed into any components where audio frames are necessary, and the decoding process will not be explicitly discussed in the present application although it does exist. Accordingly, the term "frame" shall be construed as including a real frame already decoded from a packet or still encoded in the packet, or a packet itself including one or more frames, or more than one frame encoded in a packet or already decoded from the packet. In other words, in the context of the present application, a processing involving a frame may also be construed as a processing involving a packet, or a processing involving simultaneously more than one frame contained in a packet.

Figure 3:
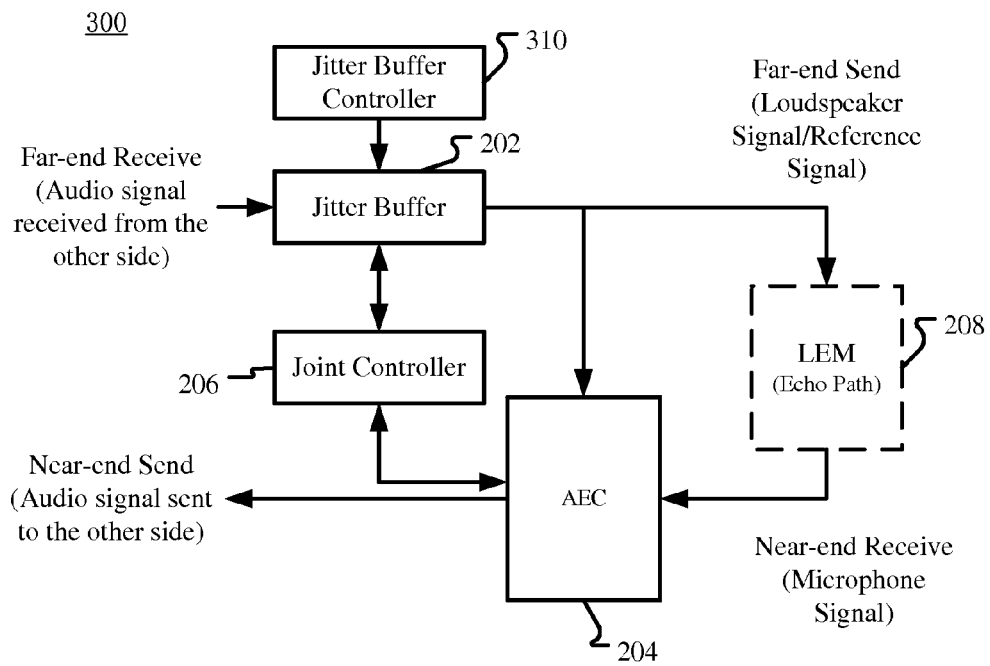
FIG. 3 is a diagram illustrating an audio processing apparatus according to a variation of the embodiment as shown in FIG. 2.

In a variant 300 of the first embodiment, as shown in FIG. 3, a jitter buffer controller 310 is further provided for increasing the length of the jitter buffer as far as the number of frames in the jitter buffer is below a predetermined threshold, so that there are enough future frames in the jitter buffer that can be used by the AEC. Increasing the length of the JB means waiting for more time so that the JB will receive and store more frames. For example, since the first frame in the JB is the present frame to be played out at once, the JB shall contain at least one more frame to be used as the future frame that the joint controller will make reference to. If at certain time point the JB contains only one frame (that is the present frame), then the JB shall be increased by one frame.

Some other scenarios for increasing the length of the JB are at the start of an echo path adaptation process or after the audio processing system is reset. In such scenarios since there is no history to be referred to, we need more future frames in the buffer and thus increase of the JB length might be necessary.

The length of the JB may not be increased unlimitedly of course and shall have an upper limit, which may be either fixed to a predetermined constant or adaptive according to various existing techniques.

Increasing of the JB length may be realized with various techniques, including adding a silence frame or a synthesized new frame, or repeating a playout frame (that is the frame having just been pushed out of the JB) at the head of the JB. Generally, before the beginning of a talkspurt, a silence frame may be added because before a talkspurt it is a silence period. When within a talkspurt, which kind of frame is to be added shall be determined depending on specific situations. When the delay jitter is relatively gentle, frame repeating is acceptable and will not incur obvious artifacts. When the delay jitter is severe, then silence frame(s) might be necessary to insert to avoid obvious artifacts, or synthesized new frame(s) may be inserted for concealing the packet loss(es). But for long packet loss, synthesized new frames eventually have to fade to zero to avoid artifacts.

According to the embodiment, any information of the future frame(s), including the future frame(s) itself, may be used to control the AEC, generally by controlling a working parameter of the AEC. As an example, signal intensity of the at least one future frame in the jitter buffer may be used. Here, the term "signal intensity" shall be understood in a broad sense, and means any metric capable of directly or indirectly reflecting the power or energy of an audio frame. Such metrics include but are not limited to signal power, log signal power, signal amplitude etc.

In the embodiment and its variation discussed above, the joint controller 206 may not work constantly and may be configured to work when necessary. For example, the joint controller may be configured to be triggered when the acoustic echo canceller detects possible filter divergence. Generally the AEC will comprise an adaptive filter for canceling the acoustic echo. The filter divergence can be measured as the fluctuation of the amplitude/norm of filter coefficients. If the variance of the amplitude/norm in the past several frames exceeds a predefined threshold, divergence is claimed. Moreover, the joint controller can also be triggered by detecting high residual echo level, which can be evaluated by calculating the ratio of the power of residual echo over that of the filter output and then deciding if the ratio exceeds a predefined threshold.

Convergence Rate Control

Figure 4:
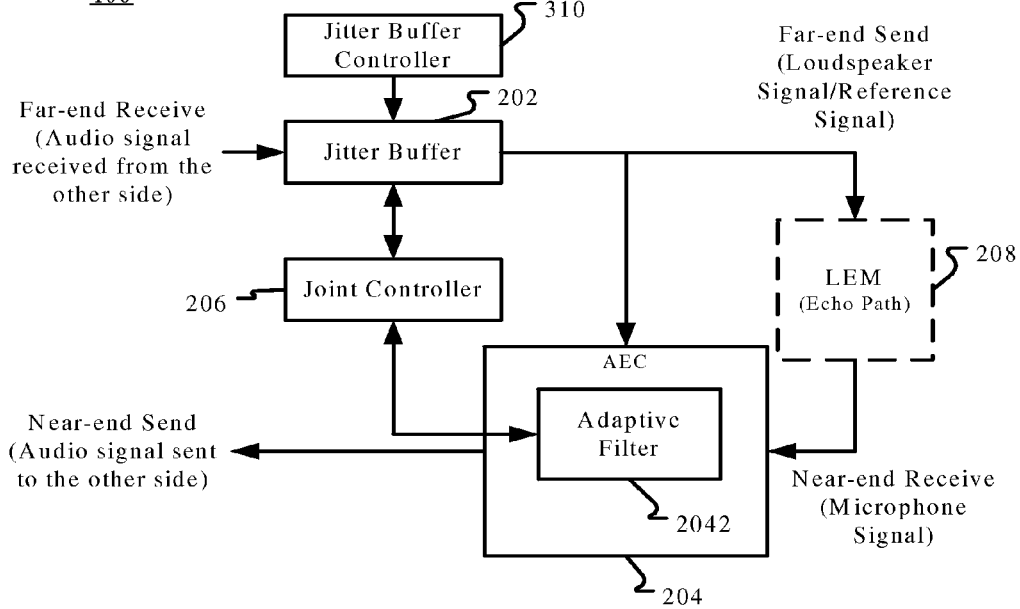
FIG. 4 is a diagram illustrating an audio processing apparatus according to another embodiment of the application.

FIG. 4 shows a second embodiment obtained by further modifying the first embodiment and its variants, and thus detailed description regarding the components already described is omitted. Please note just as in the first embodiment, the JB controller 310 is optional.

According to the second embodiment, the acoustic echo canceller 204 comprises an adaptive filter 2042, and the joint controller 206 is configured to increase or decrease a convergence rate of the adaptive filter in response to increasing or decreasing of the signal intensity of the at least one future frame, respectively.

For example, if the next one or several frames have very low energy, we could decrease the convergence rate in anticipating weak echo in the microphone signal to slow down the adaptation. When the echo is weak, the microphone signal is likely to be dominated by ambient noise or near end speech. Thus slowing down adaptation in this case would avoid filter divergence. Similarly, when the next one or several frames have high energy speech signals, the convergence rate would be increased in anticipating strong echo in the microphone signal.

Most of the acoustic echo cancellers are based on NLMS (Normalized Least Mean Squares)-based adaptive filtering algorithms. Let $X(\omega,t)$, $D(\omega,t)$, $\omega$ and $t$ denote the reference signal, microphone signal, frequency and time, respectively. The key operations of NLMS are:

Synthesize the echo signal: $U(\omega,t)=H(\omega,t)X(\omega,t)$, where $H(\omega,t)$ is the adaptive filter;

Generate residual signal: $E(\omega,t)=D(\omega,t)-U(\omega,t)$; and

Update the adaptive filter:

$$H(\omega, t+1) = H(\omega, t) + \frac{\mu}{P_X(\omega, t) + \varepsilon} X^*(\omega, t) E(\omega, t),$$

where $P_X(\omega,t)$ is the power of reference signal, $\mu$ is the step size, and $\varepsilon$ is a predetermined regularization constant for avoiding zero denominator.

It could be seen that the step size will affect the convergence rate of the adaptive filter. Therefore, when the adaptive filter comprises an NLMS-based filter, the joint controller may be configured to increase or decrease the step size of the adaptive filter in response to increasing or decreasing of the signal intensity of the at least one future frame, respectively.

To determine increasing or decreasing of the signal intensity of the at least one future frame, we can compare an average future signal power of the at least one future frame with a signal power of the present frame. In the context of the present application, the term "compare" means either comparison through subtraction operation or comparison through division operation. We can determine an increase or decrease by determining whether the difference is greater than 0 or whether the ratio is greater than 1. In specific implementation, we can directly relate the convergence rate or step size with the difference or ratio through proper algorithm and it is not necessary for an "external observer" to know explicitly whether the signal intensity has increased or decreased.

As an example, when determining increasing or decreasing of the step size (that is the increasing or decreasing of the signal intensity of the at least one future frame) by comparing an average future signal power of the at least one future frame with a signal power of the present frame, we can use the following equation (or any variation thereof) to directly calculate the step size $\mu$, and then update the step size $\mu$:

$$\mu(t) = C \cdot \frac{\frac{1}{Q}\sum_{q=1}^{Q}|X_{t+q}|^2}{X^2(t)} \quad (1)$$

where $\mu(t)$ is the step size of the adaptive filter for the frame at the time t, $X^2(t)$ is the signal power of the present frame at the time t, $|X_{t+q}|^2$ is the signal power of the $q^{th}$ frame after the frame at the time t, q and Q are positive integers and C is a predefined constant.

As an alternative, the joint controller may be configured to determine increasing or decreasing of the signal intensity of the at least one future frame by comparing an average future signal power of the at least one future frame with a weighted average of a signal power of a frame immediately previous to the present frame and a signal power of the present frame. In this way, a past frame may be taken into account and thus make the estimation of the step size more reasonable and severe fluctuation of the step size may be avoided. Then equation (1) may be rewritten as:

$$\mu(t) = C \cdot \frac{\frac{1}{Q}\sum_{q=1}^{Q}|X_{t+q}|^2}{\alpha X^2(t-1) + (1-\alpha)X^2(t)} \quad (2)$$

where $X^2(t)$ is the signal power of the frame at the time t, $X^2(t-1)$ is the signal power of the frame before the frame at the time t, and $\alpha$ is a smoothing factor from 0 to 1.

As another alternative, the joint controller may be configured to determine increasing or decreasing of the signal intensity of the at least one future frame by comparing an average future signal power of the at least one future frame with a weighted average of signal powers of all the previous frames within the current talkspurt and a signal power of the present frame. The weight of signal power of each previous frame within current talkspurt may be set in such a way that the earlier the frame is, the smaller the weight is. One solution is different weight sets may be predefined for different numbers of previous frames. As another solution, the weighting operation may be realized by iteratively performing the weighting mentioned in equation (2). Then the equation may be rewritten as:

$$\mu(t) = C \cdot \frac{\frac{1}{Q}\sum_{q=1}^{Q}|X_{t+q}|^2}{\sigma_X^2(t)} \quad (3)$$

where, $$\sigma_X^2(t) = \alpha\sigma_X^2(t-1) - (1-\alpha)X^2(t) \quad (4)$$

where t−1 indicates the frame immediately before the frame at the time t, $X^2(t)$ is the signal power of the frame at the time t, and $\alpha$ is a smoothing factor from 0 to 1.

In the above equations for calculating the step size, the numerator, which is the average future signal power of the at least one future frame, is always a simple average. However, the application is not limited thereto, and the numerator may be calculated by taking an algorithm similar to that for the denominator. That is, the average future signal power of the at least one future frame may be a weighted average of the signal power of the at least one future frame. Then equations (1)-(3) may be rewritten as:

$$\mu(t) = C \cdot \frac{\sigma_X^2(t+Q)}{X^2(t)} \quad (1')$$

$$\mu(t) = C \cdot \frac{\sigma_X^2(t+Q)}{\alpha X^2(t-1) + (1-\alpha)X^2(t)} \quad (2')$$

$$\mu(t) = C \cdot \frac{\sigma_X^2(t+Q)}{\sigma_X^2(t)} \quad (3')$$

where, when calculating the weighted average $\sigma_X^2(t+Q)$ of the signal power of the at least one future frame, the weight of signal power of the at least one future frame may be set in a way similar to $\sigma_X^2(t)$ as discussed above. That is, the earlier the frame is, the smaller the weight is. One solution is different weight sets may be predefined for different numbers of future frames. As another solution, the weighting operation may be realized by iteratively performing the weighting mentioned in equation (2).

$$\sigma_X^2(t+q) = \alpha \sigma_X^2(t+q-1) + (1-\alpha)X^2(t+q), \text{ for } q=1, \ldots Q. \quad (4')$$

A more sophisticated approach is to convert the ratio R(t) (the term after C in the above equations) into a probability as that in Sun, X., K. Yen, et al. (2010), *Robust Noise Estimation Using Minimum Correction with Harmonicity Control, Interspeech*. Makuhari, Japan:

$$p(t) = R(t)\exp(1-R(t)) \quad (5)$$

$$\mu(t) = \begin{cases} C & \text{if } p(t) \geq 1 \\ C \cdot p(t) & \text{otherwise} \end{cases} \quad (6)$$

This implies that when the future power is the same or higher we use a predefined step size, which presumably allows the filter to adapt in full speed. Otherwise, the step size is reduced to slow down the filter adaptation. That is, the joint controller may be further configured to keep the increased step size within a predetermined range C. On the other hand, the joint controller may be further configured to keep the decreased step size above a predetermined value, so that convergence rate will not decrease too much. This maintains a proper function of acoustic echo cancellation.

In summary, by refining the μ(t) in the proposed ways, huge decrease or increase in signal intensity in the reference signal can be known in advance for enhancing the performance of the adaptive filter.

The following example illustrates a particular scenario where there are continuous small nuisance signals leaked into the reference signal due to continuous transmission or imperfect sender-side cleaning in a typical VOIP system. If the LEM does not generate much echo, it is desired to freeze the adaptation during the short burst of nuisance signals to preserve voice quality. For conventional adaptive filter, the short bursts of the reference signal can cause divergence of filter coefficients, even though it is desired to keep the adaptive filter coefficients close to zeros. Diverged filter can subsequently cause speech distortion. By using the proposed method, the step size will increase and decrease before the signal intensity of the reference signal does, thus preventing the filter from updating during these short bursts.

Nonlinear Processing in AEC

Figure 5:
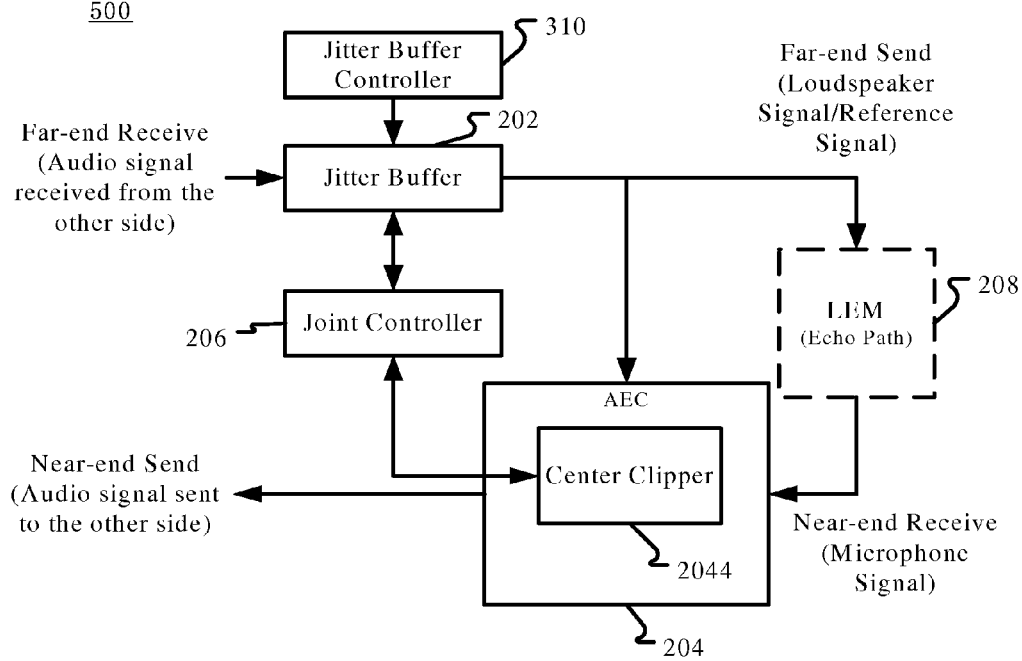
FIG. 5 is a diagram illustrating an audio processing apparatus according to yet another embodiment of the application.

FIG. 5 shows a third embodiment obtained by further modifying the first embodiment and its variant, and thus detailed description regarding the components already described is omitted. Please note just as in the first embodiment, the JB controller 310 is optional.

According to the third embodiment, the acoustic echo canceller 204 comprises a center clipper 2044 for suppressing residual echo; and the joint controller 206 is configured to increase or decrease a threshold of the center clipper 2044 in response to increasing or decreasing of the signal intensity of the at least one future frame, respectively.

In real world applications, nonlinearities commonly exist in the echo path, which are often due to overdriven loudspeaker signals. Non-linear processing such as center clipping is often used. In such methods, a predefined threshold is used where samples amplitude below this threshold are set to zero. This threshold is often tunable and adaptive. When future frames available, better adaptation of this threshold can be achieved. If the future frames are of high energy, this threshold can be set higher accordingly in anticipating future processed microphone signal will contain more residual echo.

In one conventional embodiment, when no future frames are available, we could implement the center-clipper conventionally as TH(t)=A*sqrt($\sigma_X^2$) where the center-clipping threshold at time t is TH(t), which is adjusted according to the signal power estimation.

And ẽ(t) is related to e(t) by $$\tilde{e}(t) = \begin{cases} 0, & \text{if } |e(t)| < TH(t) \\ e(t), & \text{otherwise} \end{cases} \quad (7)$$

where e(t) is the AEC output signal potentially containing residual echo, and ẽ(t) is the clipped output, and $\sigma_X^2$ is the signal power estimated using the current frame (and possibly past signal frames), A is a predetermined constant.

One problem of this approach lies in the signal power estimation. If we only use the current frame, the fluctuation of this instantaneous power estimation would lead to a rapid changing clipping threshold. As a result, the output signal would also fluctuate, producing annoying perceptual artifacts. On the other hand, if we use more history frames to generate a stable power estimation as in equation (4) mentioned above, the system would have a delayed response to abrupt change of signal levels.

Therefore, according to the third embodiment, the signal intensity of the at least one future frame in the jitter buffer is used.

Again, similar to the second embodiment, for making use of the increasing or decreasing of the signal intensity of the at least one future frame, we can directly relate the threshold with the signal intensity through proper algorithm and it is not necessary for an "external observer" to know explicitly whether the signal intensity has increased or decreased.

As an example, we can determine the threshold based on an average future signal power of the at least on future frame. For example, we can use the following equation (or any variation thereof) to directly calculate the threshold TH(t):

$$TH(t) = A \cdot \sqrt{\frac{1}{Q}\sum_{q=1}^{Q}|X_{t+q}|^2} \quad (8)$$

where TH(t) is the threshold of the center clipper for the frame at the time t, $|X_{t+q}|^2$ is the signal power of the $q^{th}$ frame after the frame at the time t, q and Q are positive integers and Q is the number of frames in the jitter buffer after the frame at the time t, A is a predefined constant.

Alternatively, instead of using the simple average, the average future signal power of the at least one future frame may be a weighted average of the signal power of the at least one future frame. Then the equation (8) may be rewritten as:

$$TH(t) = A \cdot \sqrt{\overline{\sigma_X^2(t+Q)}} \qquad (9)$$

where $\sigma_X^2(t+Q)$ has the same meaning as in equations (1') to (3').

In the examples discussed above, the threshold is determined completely based on the at least one future frame, which possibly make the threshold deviate too much from the present state of the audio signal. Therefore, in a variation, the joint controller is configured to determine the threshold according to the following equation (10) or any variation thereof:

$$TH(t) = A^*(\alpha^* \text{sqrt}(\sigma_X^2(t+Q)) + (1-\alpha)^* \text{sqrt}(\sigma_X^2(t))) \qquad (10)$$

where $\sigma_X^2(t+Q)$ and $\sigma_X^2(t)$, as well as the other symbols have the same meaning as discussed before. That is, the joint controller is configured to determine the threshold based on 1) a weighted average of the signal power of the at least one future frame, and 2) a weighted average of signal powers of all the previous frames within the current talkspurt and a signal power of the present frame. Here, "weighted average" has the same meaning as discussed before.

Alternatively, similar to the discussions above, $\sigma_X^2(t+Q)$ may be replaced with a simple average of the at least one future frame, that is $$\frac{1}{Q}\sum_{q=1}^{Q}|X_{t+q}|^2,$$

and/or $\sigma_X^2(t)$ may be replaced with a signal power of the present frame, that is $X^2(t)$.

The purpose of the above nonlinear operation is to remove small residual echo components which are supposed to be lower than the threshold TH(n). Therefore, by using the further information in the jitter buffer, the threshold can be adjusted in advance. For example, if there is a huge increase in the signal intensity of the reference signal, it is likely that the residual echo power in the output of the AEC is increased as well. Thus, using a small value of TH(t) is not sufficient for removing the strong residual echo signals (which are of large amplitude). If the threshold TH(n) is increased by using $\sigma_X^2(t+Q)$ or $$\frac{1}{Q}\sum_{q=1}^{Q}|X_{t+q}|^2,$$

which is also larger, residual echo leakage can be avoided and thus improving the overall system performance.

According to a variation 600 of the third embodiment, a variance evaluator 612 (FIG. 6) is further provided for evaluating the variance of signal powers of past frames, wherein the joint controller 206 is configured to be triggered in response to the variance exceeding a predetermined threshold. That is, we would first evaluate the signal power variance in the past. If large variation in signal power is detected, it probably means large fluctuation in residual echo and it is necessary to access the jitter buffer for acquiring future frame(s).

Echo Path Delay (EPD) Estimation

Figure 7:
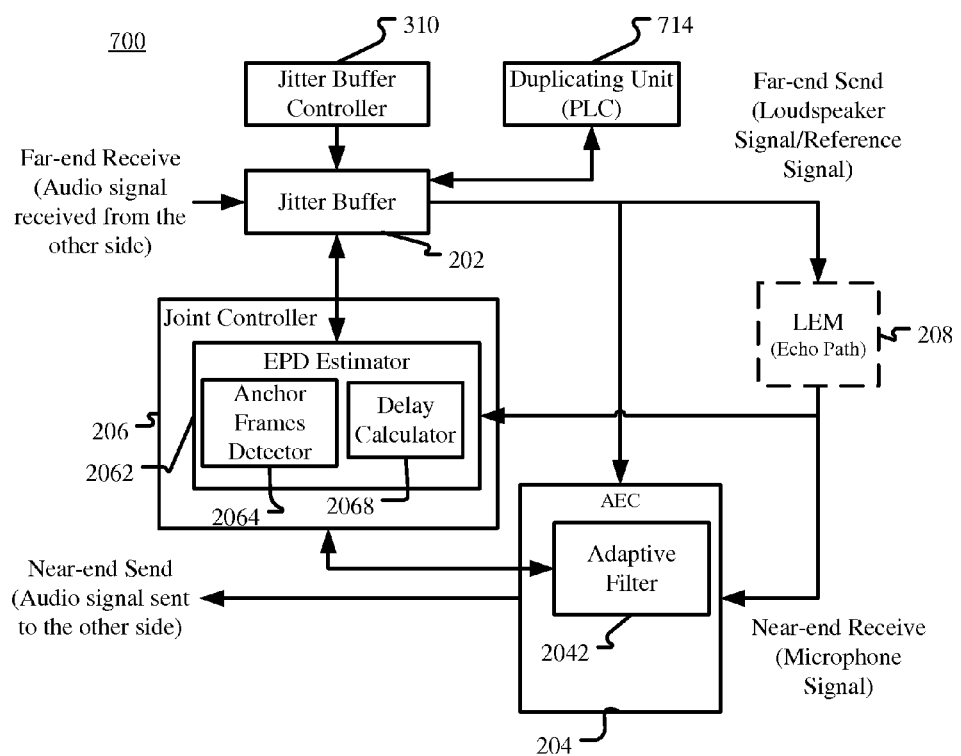
FIG. 7 is a diagram illustrating an audio processing apparatus according to yet another embodiment of the application.

FIG. 7 shows a fourth embodiment obtained by further modifying the first embodiment, the second embodiment and their variants, and thus detailed description regarding the components already described is omitted. Please note just as in the first embodiment and the second embodiment, the JB controller 310 is optional.

According to the fourth embodiment, the audio processing apparatus 700 further comprises a duplicating unit 714 for inserting, after a frame received in the jitter buffer, at least one duplicate of the received frame. Similar to the second embodiment, the AEC 204 also comprises an adaptive filter 2042. In addition, the joint controller 206 comprises an echo path delay (EPD) estimator 2062 for estimating an echo path delay to be used to adjust filter taps of the adaptive filter 2042. And the echo path delay estimator 2062 further comprises an anchor frames detector 2064 for detecting from the microphone signal adjacent frames having expected relationship originated from the relationship existing among the received frame and its at least one duplicate, and a delay calculator 2068 for estimating the echo path delay by calculating the time lapse between the playout time of the received frame and its at least one duplicate on one hand and the capture time of the detected adjacent frames on the other hand.

Echo impulse responses, whether single-path or multiple-path, are characterized by short dispersion periods followed by long flat periods. To avoid wasting filter taps for the long flat periods, it has been proposed to adjust filter taps through echo path delay estimation for improved algorithm efficiency.

Conventional EPD estimation algorithms are often based on the cross-correlation between the far-end (reference signal) and the near-end (microphone) signal. However cross-correlation can still be computationally expensive for power sensitive devices. Furthermore, the performance of such methods can be seriously affected by near end noise or speech signals.

In many jitter buffer management algorithms, duplicated packets are often inserted into the jitter buffer with or without attenuation in order to minimize packet loss impact. This work is usually done by a packet loss concealment (PLC) unit. When one or more packets are repeated, it's obvious that their correlation would be extremely high. Assuming the echo path is linear and slowly changing, we can expect such high correlation is maintained for the two frames in the microphone signal after echo path. Therefore by detecting if the adjacent microphone signal frames exhibiting the expected relationship we created in the reference signal, echo path delay can be estimated by calculating the time lapse between the anchor frames in the reference signal and their "images" in the microphone signals.

For the purpose of this application, duplicated packets may be intentionally inserted into the jitter buffer simply for creating "anchor frames" rather than packet loss concealment. That is, the duplicating unit 714 in the fourth embodiment may be, but is no necessarily a PLC unit.

When duplicating a received frame in the jitter buffer, attenuation constants may be applied. Let the current received frame be x(n) where n is the frame index, assume p−1 duplicates of the received frame are inserted for the purpose of this application or for concealing detected p−1 lost packets, and define X(n) as the vector containing p anchor frames at frame n, then:

$$X(n)=[x(n),\alpha_1 x(n),\alpha_2 x(n),\ldots \alpha_{p-1} x(n)] \quad (11)$$

where $\alpha_1, \alpha_2, \ldots \alpha_{p-1}$ are predefined attenuation constants. Hence, X(n) can be written as:

$$X(n)=x(n)[1,\alpha_1,\alpha_2,\ldots \alpha_{p-1}]=x(n)A_p \quad (12)$$

Where $A_p$ is the vector of length p sent to the EPD estimator 2062 which finds in the microphone signal d(n) the delayed version of X(n) (distorted by the transfer function), and estimates the delay between the reference signal and the microphone signal.

Briefly speaking, the duplicating unit may be configured to insert the at least one duplicate with predefined attenuation constants, and the anchor frames detector may be further configured to detect the adjacent frames having the expected relationship by detecting the adjacent frames having attenuation constants similar to the predefined attenuation constants.

For detecting the adjacent frames having the expected relationship, the anchor frames detector 2064 may find the most significant correlation between the received frame and its at least one duplicate on one hand, and consecutive frames in the microphone signal on the other hand. As an example but not limitative, a frame by frame correlation can be carried out to find the rough estimate of echo path delay. Let $M_p(n)$ denote the vector containing the averaged amplitudes p of consecutive frames from the microphone at frame index n, i.e., $$M_p(n)=[|d(n)|,|d(n+1)|\ldots |d(n+p-1)|]/|d(n)| \quad (13)$$

where the operation |d(n)| is defined as calculating the average amplitude of frame d(n). The correlation vector R is thus defined as:

$$R=[r(0),r(1),r(D_{max})] \quad (14)$$

Where $r(i)=A_p^T M_p(n+i)$ and $D_{max}$ is a predefined upper bound of the echo path delay. By finding the index of the largest value in R, the echo path delay D is obtained.

It could be noted that in FIG. 7, the duplicating unit (or PLC) 714 is arranged to control the jitter buffer 202 and the received frames and inserted frames are delivered (or requested) directly from the jitter buffer 202 to the joint controller 206, the AEC 204 and the LEM 208. However, in an alternative, it is also possible that the duplicating unit (or PLC) 714 is arranged downstream of the jitter buffer 202 and the received frames and inserted frames are delivered (or requested) directly from the duplicating unit (PLC) 714 to the joint controller 206, the AEC 204 and the LEM 208.

Combination of Embodiments and Application Scenarios

All the embodiments and variants thereof discussed above may be implemented in any combination thereof, and any components mentioned in different parts/embodiments but having the same or similar functions may be implemented as the same or separate components.

Figure 6:
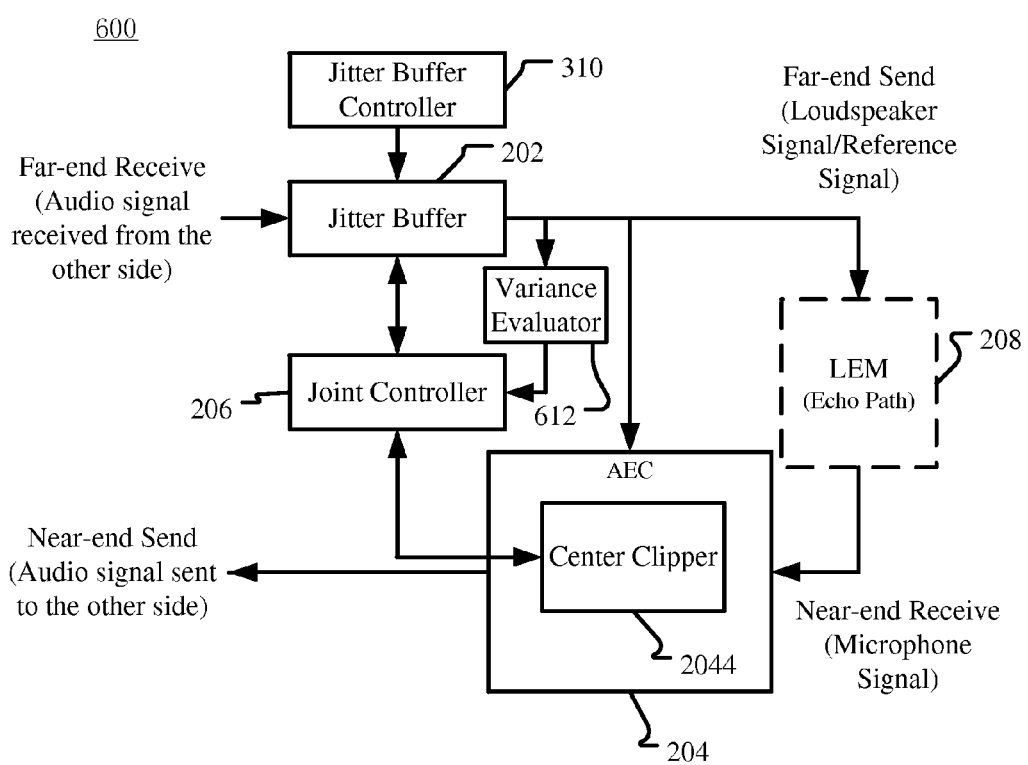
FIG. 6 is a diagram illustrating an audio processing apparatus according to a variation of the embodiment as shown in FIG. 5.

Specifically, the second to the fourth embodiments are all specific implementations of the first embodiment and its variants, but the second to the fourth embodiments are relatively independent from each other and their functions and effects substantially will not affect each other, and thus the second to the fourth embodiment can be combined with each other in any form. For example, the AEC may comprise the adaptive filter 2042 as described in the second embodiment (FIG. 4) and the fourth embodiment (FIG. 7), and/or the center clipper 2044 as described in the third embodiment (FIGS. 5, 6). For example again, the joint controller 206 may control the adaptive filter 2042 as described in the second embodiment (FIG. 4) and the fourth embodiment (FIG. 7), and/or the center clipper 2044 as described in the third embodiment (FIGS. 5, 6). When controlling the adaptive filter 2042, the joint controller 206 may control the convergence rate, and/or the step size, and/or filter taps. Finally, for all the discrete embodiments and any combination thereof, the JB controller 310 and the variance evaluator 612 are optional.

Figure 8:
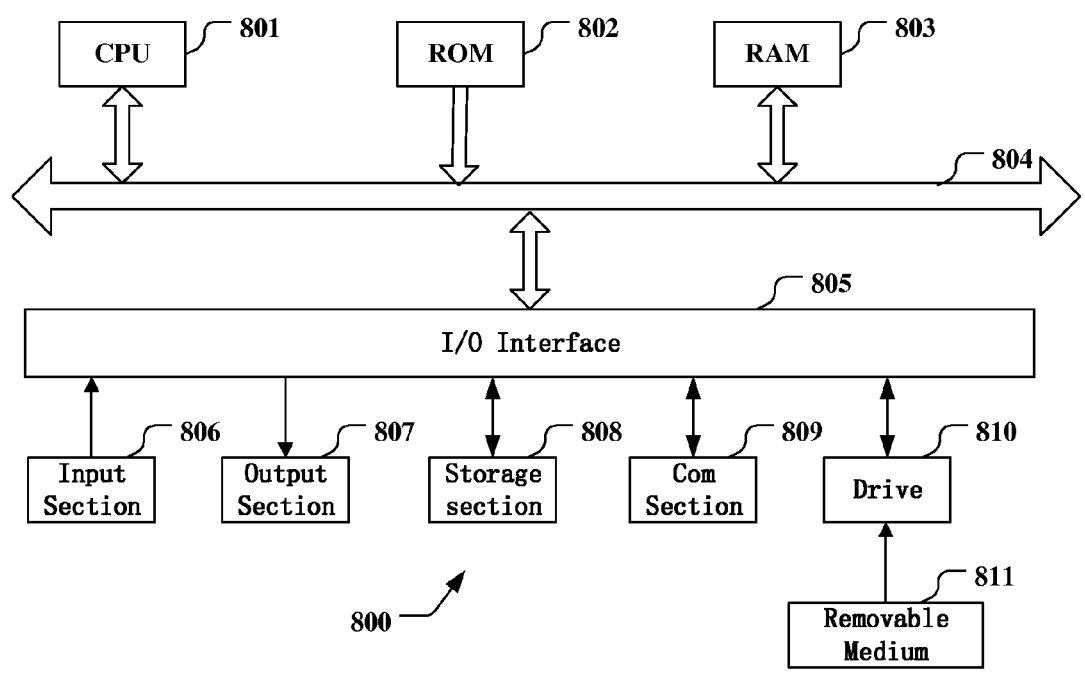
FIG. 8 is a block diagram illustrating an exemplary system for implementing embodiments of the present application.

As discussed at the beginning of the Detailed Description of the present application, the embodiment of the application may be embodied either in hardware or in software, or in both. FIG. 8 is a block diagram illustrating an exemplary system for implementing the aspects of the present application.

In FIG. 8, a central processing unit (CPU) 801 performs various processes in accordance with a program stored in a read only memory (ROM) 802 or a program loaded from a storage section 808 to a random access memory (RAM) 803. In the RAM 803, data required when the CPU 801 performs the various processes or the like are also stored as required.

The CPU 801, the ROM 802 and the RAM 803 are connected to one another via a bus 804. An input/output interface 805 is also connected to the bus 804.

The following components are connected to the input/output interface 805: an input section 806 including a keyboard, a mouse, or the like; an output section 807 including a display such as a cathode ray tube (CRT), a liquid crystal display (LCD), or the like, and a loudspeaker or the like; the storage section 808 including a hard disk or the like; and a communication section 809 including a network interface card such as a LAN card, a modem, or the like. The communication section 809 performs a communication process via the network such as the internet.

A drive 810 is also connected to the input/output interface 805 as required. A removable medium 811, such as a magnetic disk, an optical disk, a magneto-optical disk, a semiconductor memory, or the like, is mounted on the drive 810 as required, so that a computer program read there from is installed into the storage section 808 as required.

In the case where the above-described components are implemented by the software, the program that constitutes the software is installed from the network such as the internet or the storage medium such as the removable medium 811.

Methods for Controlling Acoustic Echo Cancellation

In the process of describing the audio processing apparatus in the embodiments hereinbefore, apparently disclosed are also some processes or methods. Hereinafter a summary of these methods is given without repeating some of the details already discussed hereinbefore, but it shall be noted that although the methods are disclosed in the process of describing the audio processing apparatus, the methods do not necessarily adopt those components as described or are not necessarily executed by those components. For example, the embodiments of the audio processing apparatus may be realized partially or completely with hardware and/or firmware, while it is possible that the method for controlling acoustic echo cancellation discussed below may be realized totally by a computer-executable program, although the methods may also adopt the hardware and/or firmware of the audio processing apparatus.

According to a fifth embodiment of the present application, a method for controlling acoustic echo cancellation is provided in an audio processing apparatus comprising an acoustic echo canceller for suppressing acoustic echo in a microphone signal and a jitter buffer for reducing delay jitter of a received signal, and the method comprises controlling the acoustic echo canceller by referring to at least one future frame in the jitter buffer.

Figure 9:
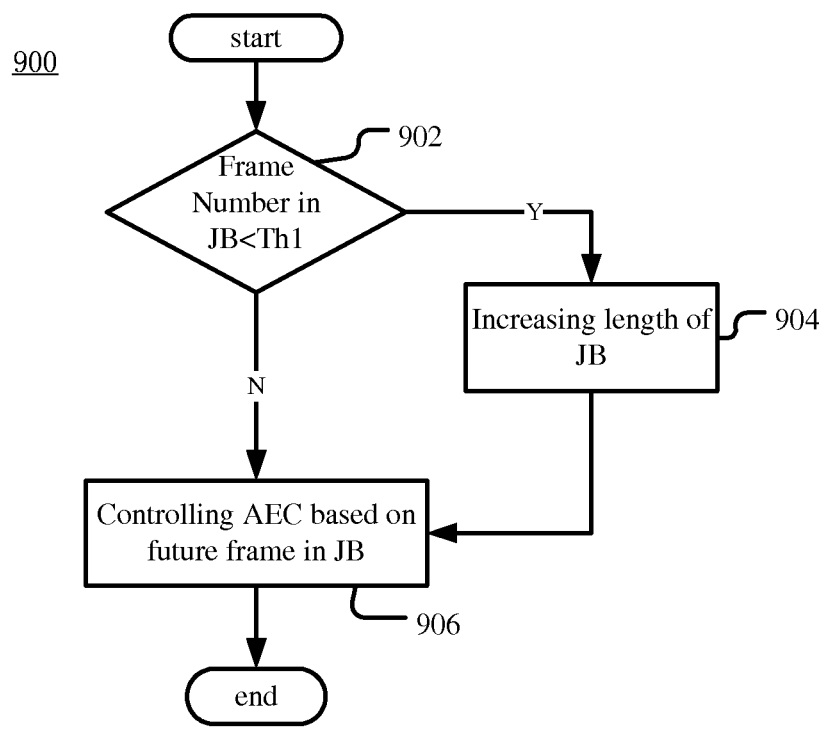
FIGS. 9-14 are flow charts illustrating methods for controlling acoustic echo cancellation according to embodiments of the present application and some variations thereof.

In a variant of the fifth embodiment as shown in FIG. 9, the method further comprises determining whether the number of frames in the jitter buffer is below a predetermined threshold (Th1) (operation 902). If yes, then the length of the jitter buffer is increased (operation 904) so that there are enough future frames in the jitter buffer (JB) that can be used by the joint controller. Then, after increasing the length of the JB, or if the frame number in the JB is not smaller than the predetermined threshold, controlling of the AEC is performed based on at least one future frame in the JB.

Some other scenarios for increasing the length of the JB are at the start of an echo path adaptation process or after the audio processing apparatus is reset. In such scenarios since there is no history to be referred to, we need more future frames in the jitter buffer and thus increase of the JB length might be necessary.

The length of the JB may be increased by adding at least one silence frame before the beginning of a talkspurt, or by repeating at least one playout frame or adding at least one silence frame or synthesized new frame within a talkspurt. The length of the JB may not be increased unlimitedly, but shall be limited by an upper limit which is a predetermined constant or is adaptive.

Controlling the acoustic echo canceller (AEC) may comprise, among others, controlling a working parameter of the acoustic echo canceller, such as convergence rate, step size, and/or filter taps of the adaptive filter of the AEC, and/or clipping threshold of the center clipper in the AEC. Such controlling may be based on, among others, signal intensity of the at least one future frame in the jitter buffer. Here the term "signal intensity" shall be construed in a broad sense and means any metrics capable of directly or indirectly reflecting the power or energy of an audio frame. Such metrics include but are not limited to signal power, log signal power, signal amplitude etc.

Figure 10:
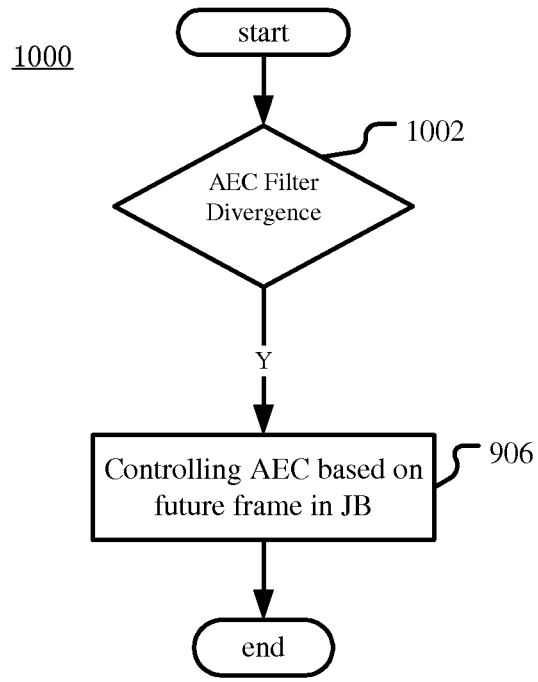
Figure 11:
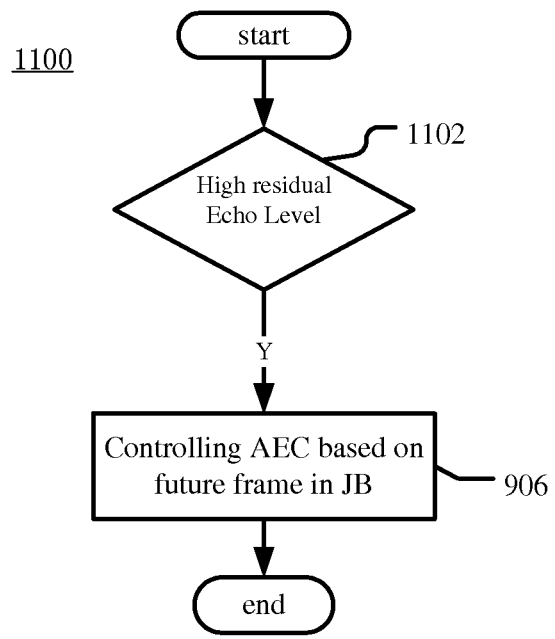

In another variant 1000 of the fifth embodiment as shown in FIG. 10, the operation of controlling the acoustic echo canceller (operation 906) is triggered when the acoustic echo canceller detects possible filter divergence (operation 1002). In yet another variant 1100 of the fifth embodiment as shown in FIG. 11, the operation of controlling the acoustic echo canceller (operation 906) is triggered when the acoustic echo canceller detects high residual echo level (operation 1102).

According to a sixth embodiment of the application, when the acoustic echo canceller comprises an adaptive filter, the operation of controlling the acoustic echo canceller may comprise increasing or decreasing a convergence rate of the adaptive filter in response to increasing or decreasing of the signal intensity of the at least one future frame, respectively. In many cases, the convergence rate is controlled by a step size of the adaptive filter, such as an NLMS-based filter, and thus the operation of controlling the acoustic echo canceller may further comprise increasing or decreasing a step size of the adaptive filter in response to increasing or decreasing of the signal intensity of the at least one future frame, respectively.

The increased and/or decreased step size may be kept within a predetermined range.

For determining the increasing or decreasing of the signal intensity of the at least one future frame and thus determining the increased or decreased step size, many methods may be adopted. For example, it may be realized by comparing an average future signal power of the at least one future frame with a signal power of the present frame; or by comparing an average future signal power of the at least one future frame with a weighted average of signal powers of a frame immediately previous to the present frame and a signal power of the present frame; or by comparing an average future signal power of the at least one future frame with a weighted average of signal powers of all the previous frames within the current talkspurt and a signal power of the present frame.

In addition, the average future signal power of the at least one future frame mentioned above may be a weighted average of the signal power of the at least one future frame. In summary, the step size may be determined based on equations (1)-(6) and (1')-(4') and any variants thereof discussed or not discussed.

According to a seventh embodiment of the application, when the acoustic echo canceller comprises a center clipper for suppressing residual echo, the operation of controlling the acoustic echo canceller may comprise increasing or decreasing a threshold of the center clipper in response to increasing or decreasing of the signal intensity of the at least one future frame, respectively.

For determining the increasing or decreasing of the signal intensity of the at least one future frame and thus determining the increased or decreased threshold, many methods may be adopted. For example, the threshold may be determined based on an average future signal power of the at least one future frame only, or together with a signal power of the present frame. Or, the threshold may be determined based on 1) an average of the signal power of the at least one future frame, and 2) a weighted average of signal powers of all the previous frames within the current talkspurt and a signal power of the present frame. Here, the average future signal power of the at least one future frame may be a weighted average of the signal power of the at least one future frame. In summary, the clipping threshold may be determined based on equations (8)-(10) and any variants thereof discussed or not discussed.

Figure 12:
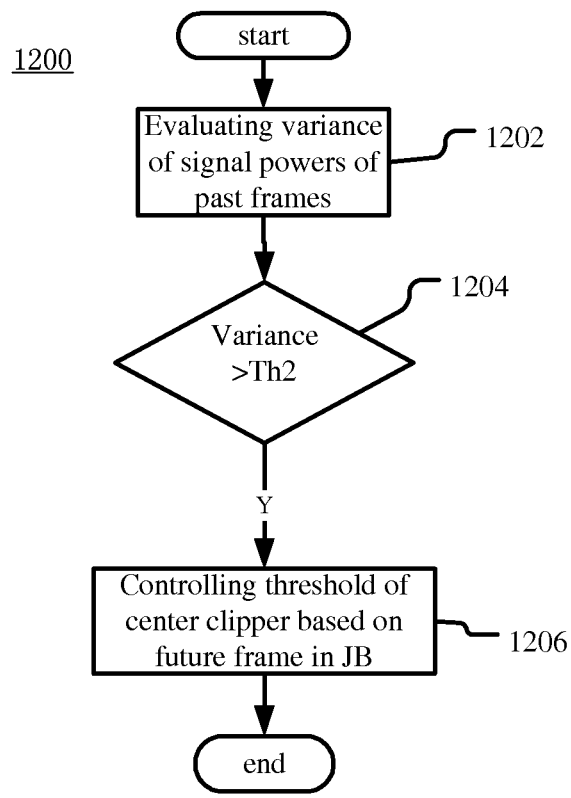

In a variant 1200 of the seventh embodiment as shown in FIG. 12, the method for controlling acoustic echo cancellation may further comprise evaluating the variance of signal powers of past frames (operation 1202), wherein the operation of controlling center clipper in the acoustic echo canceller (operation 1206) is configured to be triggered in response to the variance exceeding a predetermined threshold Th2 (operation 1204).

Figure 13:
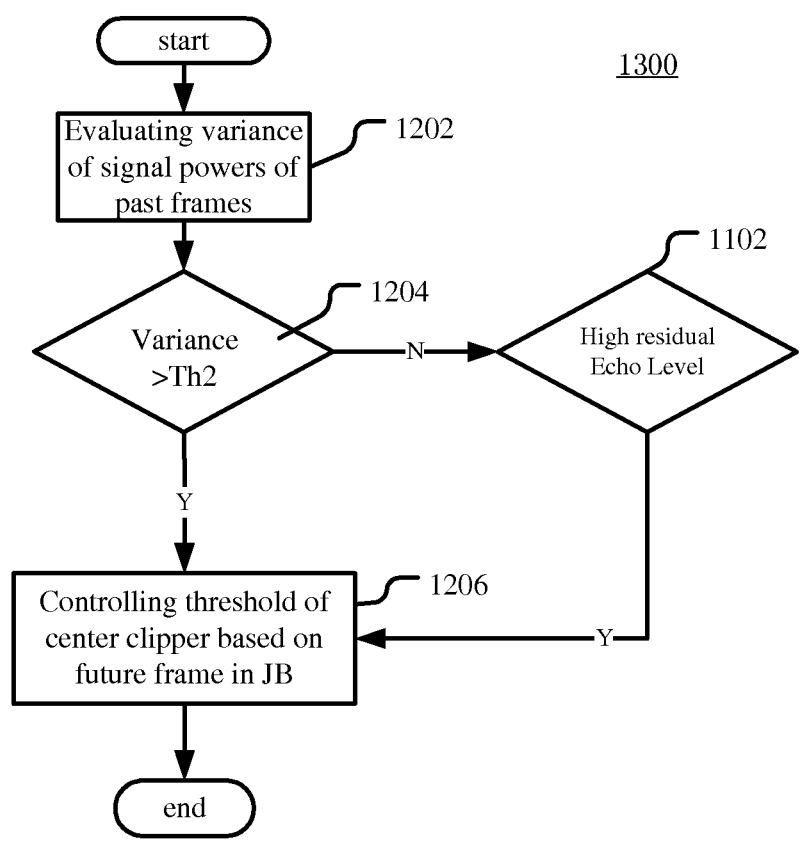

In another variant 1300 as shown in FIG. 13, the judgment about variance of signal powers of past frames (operation 1204) and the judgment about high residual echo level (operation 1102) already discussed above may be combined with each other. That is, either when the variance is greater than the predetermined threshold Th2 or when the residual echo level is high, the operation of controlling the threshold of the center clipper based on at least one future frame in the JB will be triggered. Please note that although in FIG. 13 the operation of judging the variance (operation 1204) is shown as preceding the operation of judging the residua echo level (operation 1102), the sequence does not matter and the sequence may be inversed, or both operations may be performed simultaneously.

Figure 14:
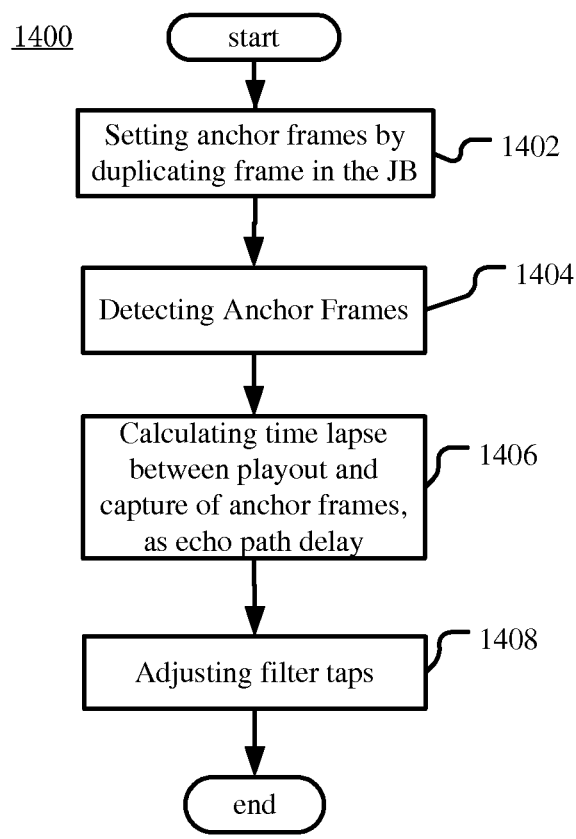

According to an eighth embodiment of the application as shown in FIG. 14, when the acoustic echo canceller comprises an adaptive filter, the operation of controlling the acoustic echo canceller may comprise estimating an echo path delay (operations 1404 and 1406) to be used to adjust filter taps of the adaptive filter (operation 1408). And the method for controlling acoustic echo cancellation 1400 (FIG. 14) may further comprise inserting, after a frame received in the jitter buffer, at least one duplicate of the received frame, and thus setting anchor frames (the received frame and the at least one duplicate thereof) to be used as the reference for calculating the echo path delay (operation 1402). And the operation of estimating the echo path delay further comprises detecting the anchor frames from the microphone signal (operation 1404), that is, detecting adjacent frames having expected relationship originated from the relationship existing among the received frame and its at least one duplicate; and estimating the echo path delay by calculating the time lapse between the playout time of the received frame and its at least one duplicate on one hand and the capture time of the detected adjacent frames on the other hand (operation 1406).

When inserting the at least one duplicate of the received frame, a predefined attenuation constant may be assigned to the duplicate, and the operation of detection may comprise detecting the adjacent frames having the expected relationship by detecting the adjacent frames having attenuation constants similar to the predefined attenuation constants. Further, this may be accomplished by finding the most significant correlation between the received frame and its at least one duplicate on one hand, and consecutive frames in the microphone signal on the other hand. There may be many cross-correlation techniques, and an example has already been given through the equations (11)-(14).

The operation of inserting the at least one duplicate may be performed by a packet loss concealment unit for purpose of concealing packet loss, but may also be performed only for the purpose of this application, or both.

Similar to the embodiments of the audio processing apparatus, any combination of the fifth to eighth embodiment and their variations are practical. And, since the embodiments are relatively independent from each other and their functions and effects substantially will not affect each other, when combined with each other, the sequence of operations of respective embodiments does not matter, and the operations from different embodiments may be performed in any sequence or simultaneously. Certainly, if some operations may be shared between different embodiments, the sequence may be adjusted properly.

Please note the terminology used herein is for the purpose of describing particular embodiments only and is not intended to be limiting of the application. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, operations, steps, elements, and/or components, but do not preclude the presence or addition of one or more other features, integers, operations, steps, elements, components, and/or groups thereof.

The corresponding structures, materials, acts, and equivalents of all means or operation plus function elements in the claims below are intended to include any structure, material, or act for performing the function in combination with other claimed elements as specifically claimed. The description of the present application has been presented for purposes of illustration and description, but is not intended to be exhaustive or limited to the application in the form disclosed. Many modifications and variations will be apparent to those of ordinary skill in the art without departing from the scope and spirit of the application. The embodiment was chosen and described in order to best explain the principles of the application and the practical application, and to enable others of ordinary skill in the art to understand the application for various embodiments with various modifications as are suited to the particular use contemplated.

We claim:

1. An audio processing apparatus, comprising:
   an input-output interface;
   a memory device that includes a jitter buffer for reducing delay jitter of a received signal received via the input-output interface, wherein the received signal comprises one or more encoded or decoded audio frames stored in the jitter buffer; and
   a central processing unit, comprising:
   an acoustic echo canceller configured for suppressing acoustic echo in a microphone signal of an audio frame received from the jitter and for outputting audio frames having a suppressed acoustic echo, wherein the acoustic echo canceller includes at least one of an adaptive filter or a center clipper; and
   a joint controller for controlling the acoustic echo canceller by referring to at least one future frame in the jitter buffer, wherein:
   the at least one future frame comprises at least one audio frame stored in the jitter buffer but not yet provided to the acoustic echo canceller;
   the joint controller is configured to control a working parameter of the acoustic echo canceller based on a signal intensity of the at least one future frame in the jitter buffer; and
   the working parameter comprises an indication of at least one of a convergence rate, a step size or a filter tap of the adaptive filter or a clipping threshold of the center clipper.

2. The audio processing apparatus according to claim 1, further comprising a jitter buffer controller for increasing the length of the jitter buffer as far as the number of frames in the jitter buffer is below a predetermined threshold, so that there are enough future frames in the jitter buffer that can be used by the joint controller.

3. The audio processing apparatus according to claim 2, wherein the jitter buffer controller is configured to increase the length of the jitter buffer at the start of an echo path adaptation process or after the audio processing apparatus is reset.

4. The audio processing apparatus according to claim 2, wherein the jitter buffer controller is configured to increase the length of the jitter buffer by adding at least one silence frame before the beginning of a talkspurt, or repeating at least one playout frame or adding at least one silence frame or synthesized new frame within a talkspurt.

5. The audio processing apparatus according to claim 2, wherein the length of the jitter buffer is limited by an upper limit which is a predetermined constant or is adaptive.

6. The audio processing apparatus according to claim 1, wherein the signal intensity is represented by any one of signal power, log signal power and signal amplitude.

7. The audio processing apparatus according to claim 1, wherein the joint controller is configured to be triggered when the acoustic echo canceller detects possible filter divergence or high residual echo level.

8. The audio processing apparatus according to claim 1, wherein,
the acoustic echo canceller comprises an adaptive filter; and
the joint controller is configured to increase or decrease a convergence rate of the adaptive filter in response to increasing or decreasing of the signal intensity of the at least one future frame, respectively.

9. The audio processing apparatus according to claim 8, wherein,
the adaptive filter comprises an NLMS-based filter; and
the joint controller is configured to increase or decrease a step size of the adaptive filter in response to increasing or decreasing of the signal intensity of the at least one future frame, respectively.

10. The audio processing apparatus according to claim 8, wherein the joint controller is further configured to keep the increased and/or decreased step size within a predetermined range.

11. The audio processing apparatus according to claim 8, wherein the joint controller is configured to determine increasing or decreasing of the signal intensity of the at least one future frame by comparing 1) an average future signal power of the at least one future frame with 2) a signal power of the present frame.

12. The audio processing apparatus according to claim 8, wherein the joint controller is configured to determine increasing or decreasing of the signal intensity of the at least one future frame by comparing 1) an average future signal power of the at least one future frame with 2) a weighted average of signal powers of a frame immediately previous to the present frame and a signal power of the present frame.

13. The audio processing apparatus according to claim 8, wherein the joint controller is configured to determine increasing or decreasing of the signal intensity of the at least one future frame by comparing 1) an average future signal power of the at least one future frame with 2) a weighted average of signal powers of all the previous frames within the current talkspurt and a signal power of the present frame.

14. The audio processing apparatus according to claim 11, wherein the average future signal power of the at least one future frame is a weighted average of the signal power of the at least one future frame.

15. The audio processing apparatus according to claim 1, wherein,
the acoustic echo canceller comprises a center clipper for suppressing residual echo; and
the joint controller is configured to increase or decrease a threshold of the center clipper in response to increasing or decreasing of the signal intensity of the at least one future frame, respectively.

16. The audio processing apparatus according to claim 1, further comprising a duplicating unit for inserting, after a frame received in the jitter buffer, at least one duplicate of the received frame, wherein,
the acoustic echo canceller comprises an adaptive filter; and
the joint controller comprises an echo path delay estimator for estimating an echo path delay to be used to adjust filter taps of the adaptive filter, wherein
the echo path delay estimator comprises:
an anchor frames detector for detecting from the microphone signal adjacent frames having expected relationship originated from the relationship existing among the received frame and its at least one duplicate; and
a delay calculator for estimating the echo path delay by calculating the time lapse between the playout time of the received frame and its at least one duplicate on one hand and the capture time of the detected adjacent frames on the other hand.

17. The audio processing apparatus according to claim 16, wherein,
the duplicating unit is configured to insert the at least one duplicate with predefined attenuation constants, and
the anchor frames detector is further configured to detect the adjacent frames having the expected relationship by detecting the adjacent frames having attenuation constants similar to the predefined attenuation constants.

18. A method for controlling acoustic echo cancellation in an audio processing apparatus, the method comprising:
receiving, at an acoustic echo canceller of the audio processing apparatus, an audio frame from a jitter buffer of the audio processing apparatus, wherein the acoustic echo canceller includes at least one of an adaptive filter or a center clipper;
automatically controlling, via a joint controller, the acoustic echo canceller by referring to at least one future frame in the jitter buffer; and
outputting, from the acoustic echo canceller, audio frames having a suppressed acoustic echo, wherein:
the at least one future frame comprises at least one encoded or decoded audio frame stored in the jitter buffer but not yet provided to the acoustic echo canceller;
the joint controller is configured to control a working parameter of the acoustic echo canceller based on a signal intensity of the at least one future frame in the jitter buffer; and
the working parameter comprises an indication of at least one of a convergence rate, a step size or a filter tap of the adaptive filter or a clipping threshold of the center clipper.

19. A non-transitory computer-readable medium having computer program instructions recorded thereon, when being executed by a processor, the instructions enabling the processor to execute a method for controlling acoustic echo cancellation in an audio processing apparatus, the method comprising:
receiving, at an acoustic echo canceller of the audio processing apparatus, an audio frame from a jitter buffer of the audio processing apparatus, wherein the acoustic echo canceller includes at least one of an adaptive filter or a center clipper;
automatically controlling, via a joint controller, the acoustic echo canceller by referring to at least one future frame in the jitter buffer; and
outputting, from the acoustic echo canceller, audio frames having a suppressed acoustic echo, wherein:
the at least one future frame comprises at least one encoded or decoded audio frame stored in the jitter buffer but not yet provided to the acoustic echo canceller;
the joint controller is configured to control a working parameter of the acoustic echo canceller based on a signal intensity of the at least one future frame in the jitter buffer; and
the working parameter comprises an indication of at least one of a convergence rate, a step size or a filter tap of the adaptive filter or a clipping threshold of the center clipper.

* * * * *